United States Patent
Sharma et al.

(10) Patent No.: US 11,495,984 B2
(45) Date of Patent: Nov. 8, 2022

(54) DUAL ROLE PORT AUTOMATIC ROLE REVERSAL PREVENTION

(71) Applicant: TEXAS INSTRUMENTS INCORPORATED, Dallas, TX (US)

(72) Inventors: Rahul Raj Sharma, Bangalore (IN); Nagesh Narayana Swamy, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 135 days.

(21) Appl. No.: 16/732,187

(22) Filed: Dec. 31, 2019

(65) Prior Publication Data
US 2021/0203168 A1    Jul. 1, 2021

(51) Int. Cl.
| | | |
|---|---|---|
| *H02J 7/00* | (2006.01) | |
| *G06F 1/26* | (2006.01) | |
| *G06F 1/3212* | (2019.01) | |
| *H01M 10/48* | (2006.01) | |

(52) U.S. Cl.
CPC .............. *H02J 7/007* (2013.01); *G06F 1/266* (2013.01); *G06F 1/3212* (2013.01); *H01M 10/48* (2013.01); *H02J 7/0047* (2013.01)

(58) Field of Classification Search
CPC . H02J 7/007; H02J 7/0047; H02J 7/00; G06F 1/266; G06F 1/26; G06F 1/3212; H01M 10/48
See application file for complete search history.

(56) References Cited

U.S. PATENT DOCUMENTS

| | | | |
|---|---|---|---|
| 9,310,868 B2 | 4/2016 | Waters et al. | |
| 10,079,499 B2 | 9/2018 | Sporck et al. | |
| 10,860,517 B1* | 12/2020 | Wang | H02M 3/06 |
| 10,868,521 B2* | 12/2020 | Choi | H02M 1/08 |
| 2016/0191313 A1 | 6/2016 | Chen et al. | |
| 2018/0292880 A1* | 10/2018 | Nakadokoro | G06F 1/3265 |

FOREIGN PATENT DOCUMENTS

WO    2018052553 A1    3/2018

OTHER PUBLICATIONS

Search Report for PCT Patent Application No. PCT/US2020/067117, date of mailing of the international search report dated Apr. 8, 1 page.

\* cited by examiner

*Primary Examiner* — Naum Levin
(74) *Attorney, Agent, or Firm* — Charles A. Brill; Frank D. Cimino (57) ABSTRACT

Aspects of the present disclosure provide for a circuit. In at least some examples, the circuit includes a dual-role port for transferring power to the circuit and from the circuit. The circuit also includes a micro-processing unit. The micro-processing unit is configured to control the circuit to operate as a sink device to receive power from a source device via the dual-role port when the power supply includes a first amount of stored energy, detect, at the dual-role port, a change in a termination resistance of the source device, and control the circuit to limit power transfer from the circuit to the power supply via the dual-role port when the power supply changes in status from a sourcing state to a sinking state.

18 Claims, 4 Drawing Sheets

```
function RpConnectionDetected
   RpLossSignal = false;
return function RpDisconnectDetected
   RpLossSignal = true;
   DisconnectHandler
return function DisconnectHandler
   DisableDRPConfiguration;
   DisconnectTimeOut == 0;
   while ( (RpLossSignal == True) and (DisconnectTimeOut <= 200) and (OperateAsSourceDever == No) )
      delay 1ms;
      increment DisconnectTimeOut;
   EnableDRPConfiguration;
return
```

DUAL ROLE PORT AUTOMATIC ROLE REVERSAL PREVENTION

BACKGROUND

Universal Serial Bus (USB) communications occur between a Host having a downstream facing port (DFP) and a Device having an upstream facing port (UFP). The DFP and the UFP are sometimes implemented by a single port referred to as a dual role port (DRP) that is controllable to operate as either a DFP or a UFP. In some USB technologies, such as USB Type-C (USB-C), the single DRP port can both source and sink power. The DRP port can also dynamically or automatically change rolls between DFP or UFP and/or between sourcing power or sinking power automatically based on one or more monitored conditions. This dynamic or automatic changing can sometimes be disadvantageous.

SUMMARY

Aspects of the present disclosure provide for a circuit. In at least some examples, the circuit includes a dual-role port for transferring power to the circuit and from the circuit. The circuit also includes a micro-processing unit. The micro-processing unit is configured to control the circuit to operate as a sink device to receive power from a source device via the dual-role port when the power supply includes a first amount of stored energy, detect, at the dual-role port, a change in a termination resistance of the source device, and control the circuit to limit power transfer from the circuit to the power supply via the dual-role port when the power supply changes in status from a sourcing state to a sinking state.

Other aspects of the disclosure provide for a system. In at least one example, the system includes a power bank configured to act as a source device. The power bank comprises a battery, a dual-role bus voltage terminal for transferring power to the battery and from the battery, and a micro-processing unit. The micro-processing unit is configured to control the battery to source power to a sink device via the dual-role bus voltage terminal when the battery includes a first amount of stored energy and inhibit power transfer from the sink device to the battery via the dual-role port when the battery includes less energy than the first amount of stored energy.

Other aspects of the present disclosure provide for a computer program product comprising a computer readable storage medium that comprises program instructions. In at least one example, the program instructions are executable by a micro-processing unit to cause the micro-processing unit to cause a device communicatively coupled to the micro-processing unit to receive power from a source device via a dual-role port capable of non-concurrent operation as both an input terminal and an output terminal, the source device having terminated a communication channel coupling the source device and the dual-role port with a pull-up signal at a source side of the communication channel while the source device is outputting power. Executing the program instructions further causes the micro-processing unit to detect removal of the pull-up signal at the source side of the communication channel and begin a timer when the removal of the pull-up signal is detected. Executing the program instructions further causes the micro-processing unit to detect a pull-down signal terminating the communication at the source side of the communication channel and inhibit a transfer of power to the source device via the dual-role port when the pull-down signal terminating the communication at the source side of the communication channel is detected prior to expiration of the timer.

BRIEF DESCRIPTION OF THE DRAWINGS

For a detailed description of various examples, reference will now be made to the accompanying drawings in which.

DETAILED DESCRIPTION

For the purposes of this disclosure, a source device refers to a device having a finite power supply (e.g., a power bank including a rechargeable battery, a portable computing device having a rechargeable battery, etc.) that discharges to charge another device. Further for the purposes of this disclosure, a sink device refers to a device that couples to a source device to receive power from the source device, for operation and/or charging of the sink device. The source device and the sink device each have a capability to reverse roles (e.g., the source acting as a sink and vice versa). When a source device, such as a rechargeable battery pack (e.g., a power bank), is electrically coupled to a sink device, such as a mobile phone, tablet device, wearable device, portable computer, etc., often an intention is to charge the sink device using power stored in the source device. Wasted energy, such as in the form of transfer losses, can occur and be counter-productive to a desired result of charging if the source and sink device reverse roles during charging.

When the source device and the sink device are each Universal Serial Bus (USB) type-C (USB-C) devices utilizing dual role ports (DRPs), the ports can dynamically reverse roles based on charge states of the source device and the sink device. For example, when the source device is coupled to the sink device and has stored more charge than the sink device, power passes from the source device to the sink device. During this time, the source device is in a sourcing state or mode of operation. When power stored by the source device is expended, in at least some examples the source device presents (e.g., such as to the initial sink device) as itself being a sink device. During this time, the source device is now in a sinking state or mode of operation. Because of the dynamic role reversal capability of the DRPs, the sink device can then begin recharging the battery of the source device if the sink device enters a sourcing state or mode of operation. In at least some circumstances, this role reversal is undesirable because energy may be lost due to heat and other transfer related losses, reducing an amount of power available for further charging. In certain circumstances this role reversal is further undesirable because the sink device that a user intended to charge by coupling the source device to the sink device may charge and then discharge again, leaving the user with little to no additional time of use of the sink device. For example, if a user couples an external rechargeable battery to a laptop computer via DRPs, an internal rechargeable battery of the laptop computer may charge based on energy received from the external rechargeable battery. When little to no energy remains in the external rechargeable battery, charging ceases. However, the laptop computer now sees the discharged external rechargeable battery as a device for charging, similar to if a discharged mobile phone were coupled to the laptop computer. Accordingly, the laptop computer may begin transferring energy from the internal rechargeable battery to the external rechargeable battery automatically. If a user is not present to observe this automatic change in roles, such as if the charging is being performed unattended, the internal rechargeable battery and the external rechargeable battery may continue transferring energy back and forth. In at least some examples, this role reversal can continue, repeating until all available energy has been expended due to losses and no energy remains for charging, or operation, of the laptop computer. Accordingly, in at least some circumstances it is desirable to prevent the automatic reversal of roles of a DRP in a source and/or sink device.

At least some aspects of the present disclosure provide for a mechanism for preventing automatic reversal of roles of a DRP. Further, at least some aspects of the present disclosure otherwise inhibit power transfer from a sink device to a source device from which the sink device was receiving power. Some implementations are performed at least partially mechanically, such as through a switch, button, or the plugging and re-plugging of a coupling. For example, when the switch is in a first position, the DRP is controlled to source power but not sink power. When the switch is in a second position, the DRP is controlled to sink power but not source power. The switch is actuated by a user based on a user's desired operation of the DRP at a given time. Accordingly, the mechanical implementation of the present disclosure requires user input in some form. Alternatively, the role reversal is prevented until a coupling between two devices is de-coupled and then re-coupled. Other implementations can be performed at least partially through software. For example, the software implementation is timer-based. In other examples, the software implementation is based on one or more alerts or messages warning of an impending role reversal of the DRPs and allowing a user to provide input to permit or deny the role reversal of the DRPs. In at least some examples, the software implementation further utilizes user input, such as preventing the role reversal until a user provides user input instructing operation in a sourcing mode.

Figure 1:
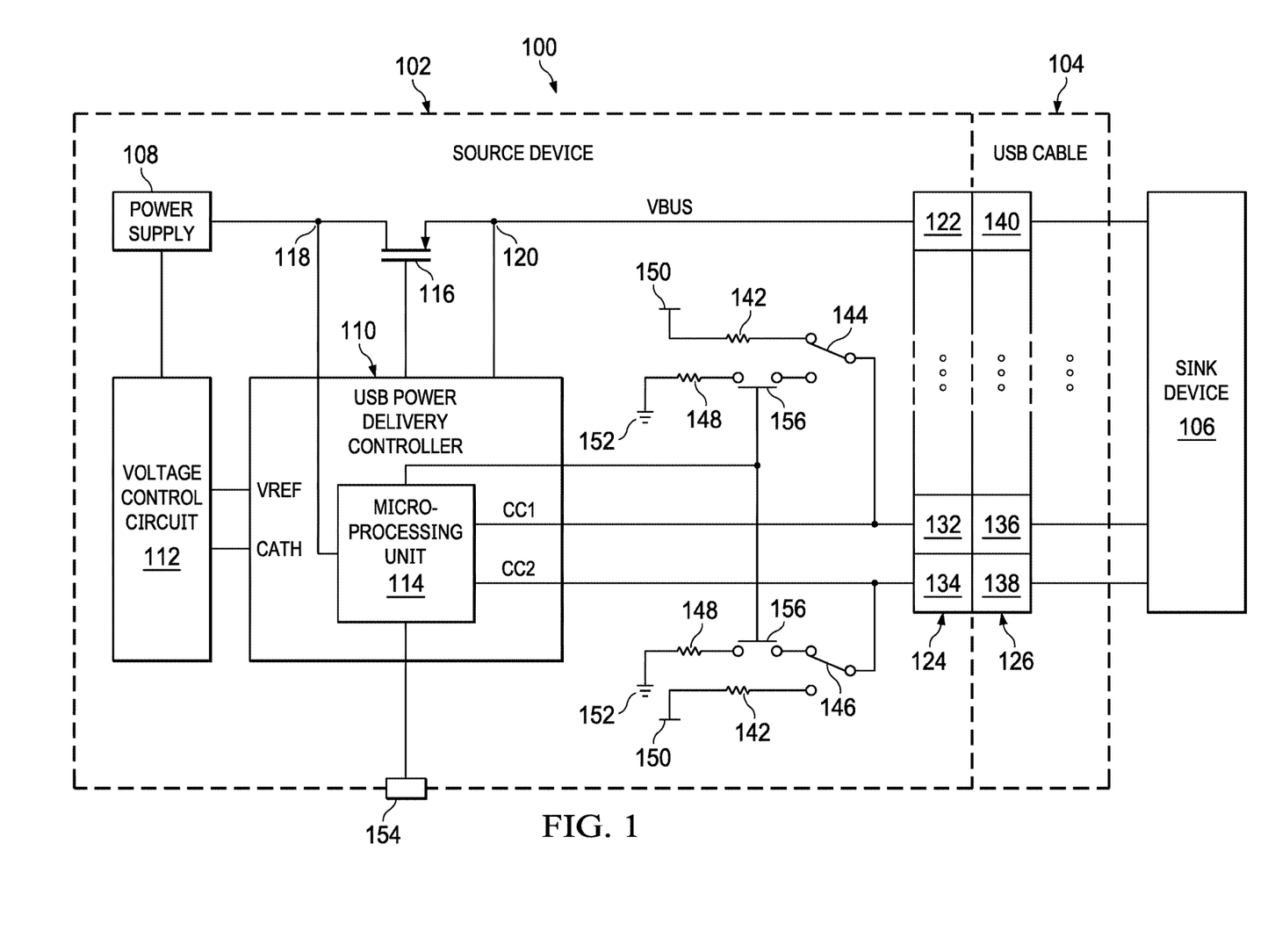
FIG. 1 shows a block diagram of an illustrative Universal Serial Bus (USB) system in accordance with various examples.

Turning now to FIG. 1, a block diagram of an illustrative USB system 100 is shown. In one example, the USB system includes a source device 102, a USB cable 104, and a sink device 106. The source device 102, in at least one example, is a device providing a signal to the sink device 106 via the USB cable 104 such that the sink device 106 pulls current from the source device 102 via the USB cable 104. In some examples, at least some of the current received by the sink device 106 from the source device 102 is stored by the sink device 106 in a battery (not shown) such that the battery is charged. In some implementations, the source device 102 includes a power supply 108, a USB power delivery (PD) controller 110, and a voltage control circuit 112. The power supply 108 is a power supply capable of providing an output signal with an adjustable voltage level that is adjusted, for example, based on a control signal received by the power supply 108. In at least some examples, the power supply 108 is, or includes, a rechargeable battery.

The power supply 108 receives the control signal from the voltage control circuit 112. In some examples, the power supply 108 receives the control signal from the voltage control circuit 112 via optical communication (e.g., an optocoupler). In other examples, the power supply 108 receives the control signal from the voltage control circuit 112 via a physical coupling between the power supply 108 and the voltage control circuit 112. In yet other examples, the power supply 108 itself is not adjustable but an external component coupled, or configured to couple, to an output of the power supply 108 adjusts a value of a signal output by the power supply 108. For example, the output of the power supply 108 may be a signal having a substantially constant voltage value that is manipulated to output one or more other signals having different voltage values than the output of the power supply 108. For example, the output of the power supply 108 may be manipulated by a power converter (not shown), such as a buck converter, a boost converter, or a buck-boost converter, and an output of the power converter may be provided to the node 118. In at least some examples, the power converter is controlled by the voltage control circuit 112 to manipulate the output of the power supply 108 to form the one or more other signals. The USB PD controller 110, in at least one example, is a microcontroller having processing capabilities. In other examples, the USB PD controller 110 is any processing element capable of receiving one or more inputs and generating one or more outputs based on rules, analysis, or other processing applied to at least some of the inputs.

The voltage control circuit 112 is any circuit capable of regulating and/or controlling a value of the signal that is present at node 118. For example, the voltage control circuit 112 is any circuit capable of receiving a reference voltage (VREF) from the USB PD controller 110 and controlling the power supply 108 according to VREF to control the value of the a bus voltage (VBUS) signal present at node 118. For example, the voltage control circuit 112 controls the power supply 108 according to VREF to cause the signal present at node 118 to have a value approximately equal, proportional, or otherwise having a relationship to a value of VREF, a scope of which is not limited herein.

The USB PD controller 110, in at least some examples, includes and/or implements at least a portion of a micro-processing unit 114. In various examples, the micro-processing unit 114 is a processor, a micro-processor, a field-programmable gate array (FPGA), a component suitable for, or capable of, implementing a state machine, or any other suitable component or device having processing capabilities. For example, when the USB PD controller 110 is a micro-controller, at least a portion of the micro-processing unit 114 is implemented as particular programming within the USB PD controller 110 to perform at least some of the operations disclosed herein. For example, the micro-processing unit 114 executes or implements software or other code for preventing automatic role reversal of a DRP port of the source device 102. The DRP port is, in at least one example, a VBUS terminal 122. For example, the VBUS terminal 122 may be a DRP port capable of providing power to the sink device 106 via the USB cable 104 or receiving power from the sink device 106 via the USB cable 104. In some examples, the source device 102 further includes a transistor 116 operable as a switch to control output of the VBUS signal via the VBUS terminal 122 and a receptacle 124 configured to receive a plug to provide a communicative coupling with the source device 102. The transistor 116 may be of any suitable technology, including at least p-type field-effect transistor (FET) or n-type FET.

In at least one example architecture, an output of the power supply 108 is coupled to a node 118 and an input of the voltage control circuit 112 is coupled to the node 118. A first terminal of the micro-processing unit 114 (which is a power supply terminal of USB PD controller 110 as shown in FIG. 1) is coupled, or configured to couple, to the node 118 and a first current terminal (e.g., a drain terminal) of the transistor 116 is coupled to the node 118. A first input of the voltage control circuit 112 is coupled to a VREF output of the USB PD controller 110 and a first output of the voltage control circuit 112 is coupled to a cathode (CATH) input of the USB PD controller 110. A control output of the USB PD controller 110 is coupled to a gate terminal of the transistor 116, a device power second terminal of the USB PD controller 110 is coupled to node 120, a second current terminal (e.g., a source terminal) of the transistor 116 is coupled to node 120, and the VBUS terminal 122 is coupled to node 120. A second terminal of the micro-processing unit 114 (which is a first configuration terminal of the USB PD controller 110 as shown in FIG. 1) is coupled to a configuration channel (CC1) terminal 132 and and a third terminal of the micro-processing unit 114 (which is a second configuration terminal of the USB PD controller 110 as shown in FIG. 1) is coupled to a CC2 terminal 134. In various examples, CC1 and CC2 are each configurable to couple to a connection voltage (VCONN) terminal 138 of the USB cable 104 or a CC terminal 136 of the USB cable 104, depending on the orientation in which the plug 126 is inserted into the receptacle 124. In some examples, the VBUS terminal 122, the CC1 terminal 132, and the CC2 terminal 134 are housed in, are parts of, or otherwise interact with the receptacle 124 to communicatively couple the source device 102 to the USB cable 104.

In at least one example, the USB cable 104 includes a plug 126 configured to interact with the receptacle 124 to communicatively couple the USB cable 104 to the source device 102. The plug 126 houses, includes, or otherwise interacts with a VBUS terminal 140, a CC terminal 136, and a VCONN terminal 138 each configured to communicatively couple the USB cable 104 to the source device 102.

The sink device 106 is any device suitable for coupling to the USB cable 104 to receive power from the source device 102 and/or communicate data with the source device 102 and the scope of the sink device 106, its hardware architecture, or its method of operation are not limited herein. In at least some examples, the sink device 106 also implements a USB controller substantially similar to the USB PD controller 110 and/or includes functionality substantially similar to the micro-processing unit 114.

In an example of operation of the system 100, after the source device 102 (e.g., the USB PD controller 110) determines that a sink device 106 has been connected to the source device 102 via the USB cable 104, the USB PD controller 110 controls the power supply 108 to output a signal having a voltage level specified by a control signal received by the power supply 108. The USB PD controller 110 controls the power supply 108 to output the signal, for example, by controlling the voltage control circuit 112.

In at least some examples, the USB PD controller 110 applies pull-up signals on both the CC1 terminal 132 and the CC2 terminal 134 and monitors the value of the signal present at each of the CC1 terminal 132 and the CC2 terminal 134. The pull-up signals are applied, in some examples, by coupling the CC1 terminal 132 and the CC2 terminal 134 to a voltage supply 150 through a pull-up termination resistor (Rp) 142. In at least some examples, the voltage supply 150 outputs a signal having a different voltage value than the power supply 108. For example, in at least some implementations the voltage supply 150 outputs a signal having a voltage of about 5V, about 3.3V, or another suitable voltage. The voltage of the signal output by the voltage supply 150, in some examples, is based on a signal output by the power supply 108 (e.g., such as an output of a regulator or converter that accepts an output of the power supply 108 as an input for generating the voltage provided by the voltage supply 150). In some examples, each of the pull-up signals has a substantially same voltage level. In other examples, each of the pull-up signals has a different voltage level. For example, the USB PD controller 110 compares the value of the signal present at each of the CC1 terminal 132 and the CC2 terminal 134 to a threshold value to determine whether it is less than a value of the pull-up signal (or some proportionate amount of the value of the pull-up signal). In various implementations, the source device 102 monitors the CC1 terminal 132 and/or the CC2 terminal 134 for the presence of an Open state, a Rd-attached state, or a Ra-attached state. The Open state exists for a CCx terminal (e.g., either of the CC1 terminal 132 or the CC2 terminal 134) when the value of the signal present at that CCx terminal is above a first threshold (in one example, 1.6V). The Rd-attached state exists for a CCx terminal when the signal present at that CCx terminal is below the first threshold and above a second threshold (in one example, 0.25V). The Ra-attached state exists for a CCx terminal when the signal present at that CCx terminal is below the second threshold. The CCx or CCy terminal (e.g., either of the CC1 terminal 132 or the CC2 terminal 134 that is not the CCx terminal) determined to be in the Rd-attached state, in at least some examples, is terminated by the sink device 106 with a pull-down termination resistor (Rd) coupled to a ground node 152.

In some examples, the USB PD controller 110 ignores the presence of the USB cable 104 when the sink device 106 is not coupled to the USB cable 104 (and thereby, the source device 102). For example, when the CCx terminal is in the Ra-attached state and the CCy terminal is in the Open state, the USB PD controller 110 ignores the presence of the USB cable 104 and does not communicate with the USB cable 104. In other examples, the USB PD controller 110 communicates with the USB cable 104 (such as when the USB cable 104 includes an electronic marker) when the CCx terminal is in the Ra-attached state and the CCy terminal is in the Open state.

In at least some examples, when the USB PD controller 110 detects the presence of the sink device 106, the USB PD controller 110 applies a signal to the VBUS terminal 122, for example, by controlling the power supply 108 to output VBUS. In some examples, the USB PD controller 110 detects the presence of the sink device 106 in one of two ways. First, when the CCx terminal is in the Rd-attached state and the CCy terminal is in the Open state or the Ra-attached state, the USB PD controller 110 determines the sink device 106 to be coupled to the source device 102. Second, when the CCx terminal is in the Open state or Ra-attached state and the CCy terminal is in the Rd-attached state, the USB PD controller 110 also determines the sink device 106 to be coupled to the source device 102. The USB PD controller 110 determines the CCx terminal or the CCy terminal to be in the Rd-attached state, in at least some examples, based on the USB PD controller 110 terminating the CCx or CCy terminal with Rp 142. The USB PD controller 110 terminates the CCx or CCy terminal with Rp 142 by controlling a switch 144 and a switch 146 to couple the CCx and the CCy terminal to Rp 142. In at least some examples, the switch 144 and the switch 146 are each controlled by the micro-processing unit 114.

Similarly, when the source device 102 is coupled to the sink device 106 (e.g., via the USB cable 104 utilizing plug 126 and receptacle 124), the sink device 106 loads or pulls down (e.g., such as via an approximately 5.1 kilo-Ohm resistance) whichever of the CC1 terminal 132 or the CC2 terminal 134 that is coupled to the CC terminal 136. Pulling down the one of the CC1 terminal 132 or the CC2 terminal 134 reduces the value of the signal present at the one of the CC1 terminal 132 or the CC2 terminal 134 that is coupled to the CC terminal 136 and places that one of the CC1 terminal 132 or the CC2 terminal 134 in the Rd-attached state.

The micro-processing unit 114, in at least some examples, controls the providing of VBUS to the VBUS terminal 122. For example, the micro-processing unit 114 controls the transistor 116 to couple the node 118 to the VBUS terminal 122. When the power supply 108 becomes discharged, the micro-processing unit 114 toggles the switch 144 and the switch 146 to couple the CCx or CCy terminal to a pull-down termination resistor (Rd) 148. When the sink device 106 performs a Rd to Rp toggle and sees the CCx or CCy terminal of the source device 102 terminated with Rd 148, the sink device 106 transitions to become a new source device and the source device 102 becomes a new sink device. However, in at least some examples the micro-processing unit 114 provides a signal to the sink device 106 (e.g., as a bit or component of a PD message or an alert message) indicating that the source device 102 and the sink device 106 should not reverse roles. When the sink device 106 has received a signal indicating that it should not reverse roles with the source device 102, in at least some examples, the sink device 106 implements a timer when the sink device 106 detects a disconnection of Rp at the source device 102. If the sink device 106 then detects Rd at the source device 102 prior to expiration of the timer, the sink device 106 does not reverse roles and become a new source device. However, if the sink device 106 detects Rd at the source device 102 after expiration of the timer, the sink device 106 reverses roles and becomes a new source device, providing power to the source device 102 which acts as the new sink device.

In other examples, when the micro-processing unit 114 determines a power level of the power supply 108 to be at or below a predefined threshold, the micro-processing unit 114 communicates an alert or other message to the sink device 106. The predefined threshold may be a percentage of a maximum charge of the power supply 108, such as about 10% maximum charge remaining, 5% maximum charge remaining, or any other predefined threshold. The alert is, for example, a notification of the declining charge of the power supply 108. In at least some examples, the alert further includes one or more interactive elements enabling a user to provide feedback. For example, the interactive elements includes an option for permitting role reversal of the source device 102 and the sink device 106 or an option for preventing role reversal of the source device 102 and the sink device 106. In at least some examples, if a user does not respond to the alert within a predefined period of time, the user's inaction is assumed to be a negative response such that role reversal of the source device 102 and the sink device 106 is prevented.

In yet other examples, the source device 102 includes a hardware switch 154, which is coupled to an input of USB PD controller 110 (and of micro-processing unit 114) as shown in FIG. 1. The hardware switch 154, in at least some examples, disconnects Rd such that the CCx or CCy terminal will be terminated by neither Rp 142 nor Rd 148 when the power supply 108 is depleted. In such an example, the user actuates the hardware switch 154 to prevent the source device 102 from terminating the CCx or CCy terminal with Rd. Preventing this termination, in at least some examples, prevents the sink device 106 from detecting the Rd 148 termination by the source device 102 and reversing roles to source power back from the sink device 106 to the source device 102. In at least some examples, based on a state of the hardware switch 154 (e.g., actuated or un-actuated), the micro-processing unit 114 controls switches 156 to decouple Rd 148 from the switch 144 and 146.

In yet other examples, when the sink device 106 detects removal of the Rp 142 termination by the source device 102, the sink device 106 initiates a timer. In some examples, the timer begins at a non-zero value and counts down to zero, expiring when the count reaches zero. In other examples, the timer begins at zero and counts up, expiring when the count reaches a predefined non-zero value. When the sink device 106 initiates the timer, the sink device disables dual-role functionality of the sink device 106. If the sink device 106 detects the Rd 148 termination by the source device 102 prior to expiration of timer, the sink device 106 maintains the disabled state of the dual-role functionality. For example, the dual-role functionality is maintained in the disabled state until user input is received instructing the source device 106 to operate as a source device, or until the Rd 148 termination by the source device 102 is no longer present. If the sink device 106 detects the Rd 148 termination by the source device 102 after expiration of timer, the sink device 106 re-enables the dual-role functionality and begins to operate in a sourcing mode to source power to the source device 102 that is now operating in a sinking mode.

While discussed above as preventing power transfer between the sink device 106 and the source device 102, in at least some other examples the power transfer is inhibited. In some examples, when power transfer is inhibited, power transfer is entirely prevented. In other examples, when power transfer is inhibited, power transfer is permitted but at a reduced rate. For example, when power transfer is inhibited, a rate of that power transfer is less than when power transfer is not inhibited.

While discussed herein and illustrated in FIG. 1 as the CC1 terminal 132 being configured to couple to the CC terminal 136 and the CC2 terminal 134 being configured to couple to the VCONN terminal 138, in some examples the couplings are reversed. For example, at least some USB cables 104 are reversible such that, depending on an orientation with which the plug 126 is inserted into the receptacle 124, the CC1 terminal 132 is configured to couple to one of the CC terminal 136 or the VCONN terminal 138 and the CC2 terminal 134 is configured to couple to the other of the CC terminal 136 or the VCONN terminal 138. Thus, while couplings associated with one orientation of insertion of the plug 126 into the receptacle 124 are described herein, couplings associated with any orientation of insertion of the plug 126 into the receptacle 124 are contemplated herein and encompassed within the scope of the present disclosure. Accordingly, in at least some examples, the USB PD controller 110 is further configured to detect and/or determine which of CC1 terminal 132 or CC2 terminal 134 is coupled to the VCONN terminal 138 (or to the CC terminal 136) to determine which of CC1 terminal 132 or CC2 terminal 134 to couple to node 118.

Figure 2:
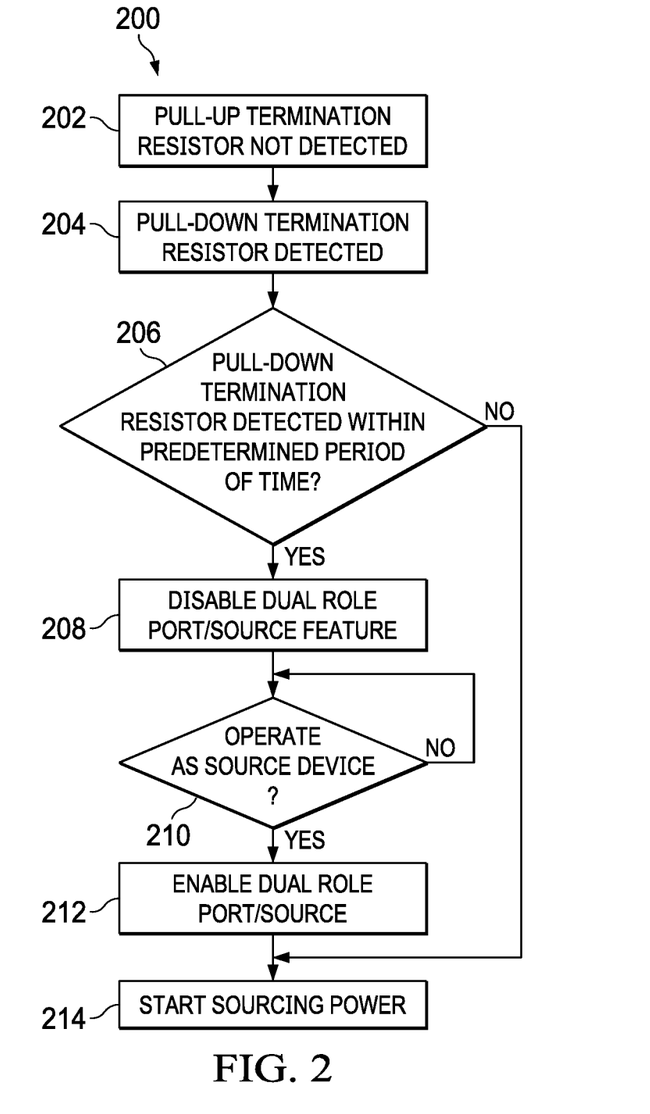
FIG. 2 shows a flowchart of an illustrative method for controlling power transfer in accordance with various examples.

Turning now to FIG. 2, a flowchart of an illustrative method 200 for controlling power transfer is shown. In at least some examples, the method 200 is implemented by a micro-processing unit, such as the micro-processing unit 114, in a second device operating as a sink device that initially receives power from a first device operating as a source device, but which can later change roles and operate as a source device. In at least some specific examples, the method 200 is implemented by a micro-processing unit, such as the micro-processing unit 114, implemented in a sink device, such as the sink device 106, each discussed above with respect to FIG. 1.

At operation 202, the second device determines that Rp is no longer detected. For example, the second device determines that Rp is no longer detected when the first device ceases presenting Rp on a CC line coupling the first and second devices. The determination that Rp is no longer present is made, in some examples, by comparing a value of a voltage present on the CC line to a threshold value. For example, when Rp is present, the voltage present on the CC line exceeds the threshold value. When Rp is not present, the voltage present on the CC line is less than the threshold value. In at least some examples, Rp no longer being detected indicates that power is no longer being delivered to the second device by the first device.

At operation 204, the second device detects the presence of Rd on a CC line coupling the first and second devices. The determination that Rd is present is made, in some examples, by comparing a value of a voltage present on the CC line to a threshold value. For example, when Rd is present, the voltage present on the CC line may be between a pair of threshold values. When Rd is not present, the voltage present on the CC line may be outside the pair of threshold values. When Rd is not detected, the method remains at operation 206. In at least some implementations, the presence of Rd on the CC line indicates that the first device is now operating as a sink device. When the second device detects Rd on the CC line, in at least some examples, the second device begins sourcing power back to the first device. However, as previously discussed herein, such an action can result in undesirable operation of the first and second devices. Accordingly, prior to the second device sourcing power to the first device, the second device proceeds to operation 206.

At operation 206, the second device determines whether Rd has been detected within a predetermined period of time of Rp no longer being detected. For example, when Rd is detected within the predetermined period of time of Rp no longer being detected, it may be an indicator that the first device has become discharged but remains coupled to the second device. In such examples, an undesirable transfer of charge back from the second device to the first device may occur when the first and second devices are coupled via a DRP. For example, when a power supply of the first device discharges, in some examples a terminal of the first device becomes terminated by Rd. This termination occurs, in at least some examples, in about 10 milliseconds (ms). In other examples, the termination occurs within about 10 ms to about 100 ms. When the first device is uncoupled from the second device and then recoupled to the second device, the terminal of the first device is still terminated by Rd. However, the physical action of decoupling and recoupling the first device and the second device may exceed the amount of time consumed in terminating the terminal of the first device when the power supply of the first device discharges. For example, the physical action of decoupling and recoupling the first device and the second device may consume about 100 ms or more. In this way, the second device is able to differentiate between a first device in which a power supply has discharged but the first device has not been de-coupled from the second device and a device that is coupled to the second device with intent for the second device to source power to the newly coupled device.

When Rd is detected within the predetermined period of time, the method 200 proceeds to operation 208. In at least some examples, the determination of whether Rd is detected within the predetermined period of time includes initiating or otherwise beginning a counter or timer when Rp is no longer detected at operation 202. When Rd is detected at operation 204, a value of the counter or timer is compared to a timer threshold value to determine whether the timer value has exceeded the timer threshold value. In at least some examples, the timer threshold value is configurable. For example, the timer threshold value is configured to expire after about 10 ms, about 50 ms, about 100 ms, about 200 ms, or any other suitable amount of time.

At operation 208, the second device disables a DRP functionality of the second device. In at least some examples, disabling the DRP functionality prevents the second device from presenting Rp on the CC line and beginning to operate as a source device to recharge the first device when the first device is presenting Rd on the CC line. Alternatively, in at least some examples instead of disabling the DRP functionality at operation 208, the second device limits a permitted rate of power transfer such that power transfer is inhibited but not entirely prevented.

At operation 210, the second device determines whether a user wishes for the second device to operate as a source device. The second device makes the determination, in at least some examples, based on input received from the user. The input is received, in some examples, via a physical, articulable input source such as a switch, toggle, button, etc. In other examples, the input is received via a soft input source such as a software button, graphical user interface button, software settings toggle, etc. In yet other examples, the input is received by way of the user unplugging and plugging back in a coupling between the first device and the second device. When the user does not wish for the second device to operate as a source device, the method 200 remains at the operation 210. When the user wishes for the second device to operation as a source device, the method 200 proceeds to operation 212.

At operation 212, the second device enables the DRP functionality of the second device. In at least some examples, enabling the DRP functionality permits the second device to present Rp on the CC line and begin to operate as a source device to recharge the first device when the first device (or another device coupled to the second device) is presenting Rd on the CC line. After enabling the DRP functionality, the method 200 proceeds to operation 214. Alternatively, when the second device did not disable the DRP functionality at operation 208 and instead inhibited the power transfer, at operation 212 the second device removes the limit to the permitted rate of power transfer that was imposed at operation 208.

Returning now to operation 206, when Rd is not detected within the predetermined period of time, it may be an indicator that the first device has become discharged and was uncoupled from the second device, but the first device, or another device operating as a sink device, has been coupled to the second device. In such examples, the method 200 proceeds to operation 214.

At operation 214, the second device begins sourcing power to a device (which may be the first device) that is coupled to the second device and is presenting Rd. The second device sources the power, in at least some examples, via a DRP that previously received power from the first device prior to Rp no longer being detected at operation 202.

Figure 3:
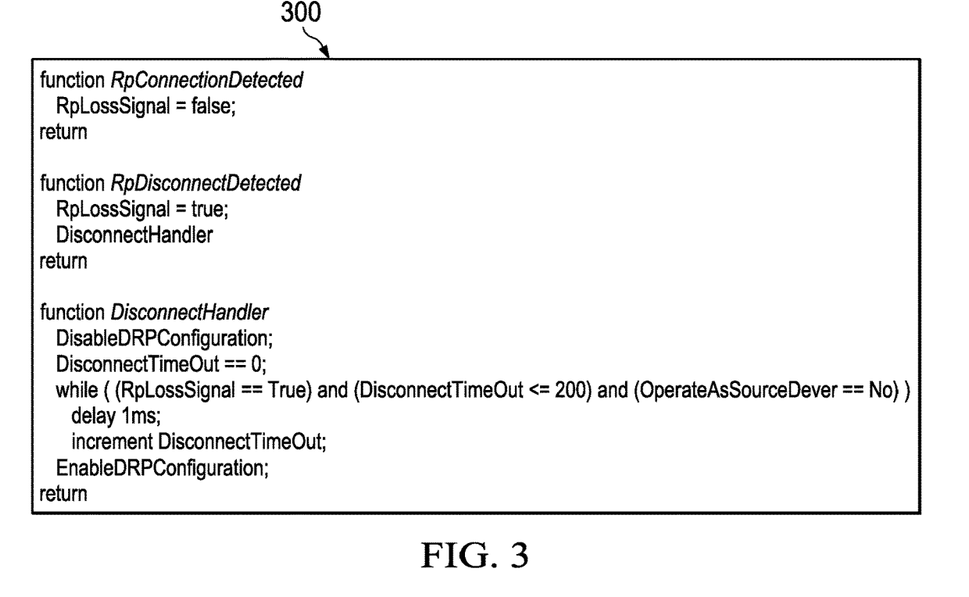
FIG. 3 shows a table of illustrative pseudocode for implementing power transfer in accordance with various examples.

Turning now to FIG. 3, a table 300 of illustrative pseudocode for implementing power transfer is shown. In at least some examples, execution of the pseudocode illustrated in the table 300 implements at least some operations of the method 200. The pseudocode of table 300 is implemented, in at least some examples, by a micro-processing unit, such as the micro-processing unit 114 of FIG. 1, when the micro-processing unit is implemented in a sink device, as described elsewhere herein.

The table 300 illustrates RpConnectionDetected, RpDisconnectDetected, and DiconnectHandler operational routines. In at least some examples, the routines illustrated in the table 300 are part of another software program or process such that the routines of the table 300 are sub-routines of the software program or process that are called by the software program or process. For example, when the software program or process receives an input signal that indicates that Rp is detected, the software program or process calls the RpConnectionDetected routine to set a variable RpLossSignal to false. Similarly, when the software program or process receives an input signal that indicates that Rp is no longer detected, the software program or process calls the RpDisconnectDetected routine to set a variable RpLossSignal to true. Additionally, as illustrated in the table 300 the RpDisconnectDetected routine calls the DisconnectHandler routine as a result of the failure to detect Rp. In other examples, after setting RpLossSignal to true, the RpDisconnectDetected routine returns to a software program or process that called the RpDisconnectDetected routine and that software program or process then calls the DisconnectHandler routine.

As illustrated in the DisconnectHandler routine, after a disconnection of Rp is detected, DRP functionality is disabled by calling a routine DisableDRPConfiguration. After disabling the DRP functionality a variable DisconnectTimeOut is initialized to zero and incremented as a timer delay, as long as RpLossSignal remains true, one unit per ms until 200 ms have elapsed or a user provides input overriding the timer delay. For example, when a user indicates that a device implementing the pseudocode of the table 300 should operate as a source device (causing the variable OperateAsSourceDevice to have a value of true, such as set by another routine or sub-routine), DisconnectHandler ceases incrementing the counter and enables the DRP functionality. Additionally, in some examples when 200 ms have elapsed since initialization of DisconnectTimeOut, DisconnectHandler ceases incrementing the counter and enables the DRP functionality. In at least some examples, the DRP functionality is enabled by calling a routine EnableDRPConfiguration.

While the table 300 illustrates pseudocode that includes certain variables, operations, functions, and a process flow, various other programming implementations of the method 200 exist. The pseudocode of table 300 is not meant to exclude these other programming implementations from the scope of the present disclosure. Instead, the pseudocode of table 300 merely illustrates one exemplary implementation while retaining other programming implementations of the method 200 within the scope of the present disclosure.

Figure 4A:
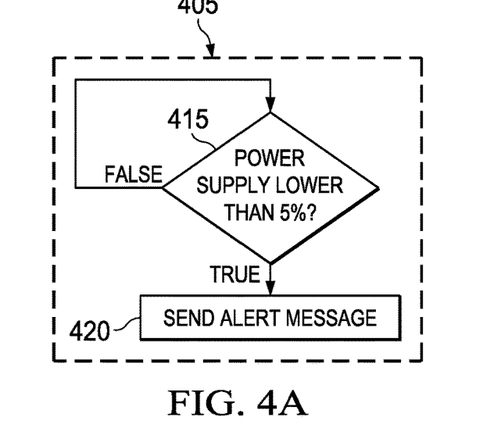
FIG. 4A shows a flowchart of an illustrative method for controlling power transfer in accordance with various examples.
Figure 4B:
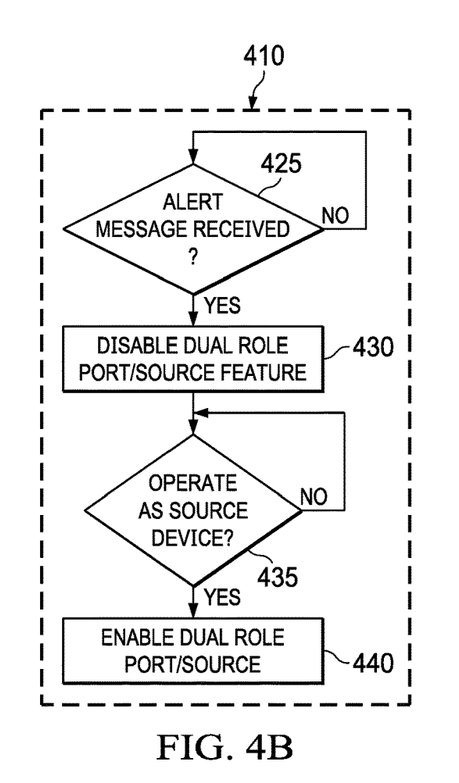
FIG. 4B shows a flowchart of an illustrative method for controlling power transfer in accordance with various examples.

Turning now to FIG. 4A and FIG. 4B, flowcharts of an illustrative method for controlling power transfer are shown. In at least some examples, the method is implemented by a pair of devices coupled together via a DRP, one of which is operating as a source device and one of which is operating as a sink device. For example, the method is at least partially implemented by a micro-processing unit, such as the micro-processing unit 114, in a first device operating as a source device that initially provides power to a second device operating as a sink device, but which may later change roles and operate as a source device. The method is further at least partially implemented by another micro-processing unit, such as the micro-processing unit 114, in the second device. In at least some specific examples, the method is partially implemented by a micro-processing unit, such as the micro-processing unit 114, implemented in a source device, such as the source device 102, discussed above with respect to FIG. 1, and a sink device, such as the sink device 106, also as discussed above with respect to FIG. 1.

For example, the method includes a first portion 405 and a second portion 410. The first portion 405 is implemented, in at least some examples, in the first device that initially operates as a source device. The second portion 410 is implemented, in at least some examples, in the second device that initially operates as a sink device. At operation 415, the first device determines whether a remaining charge of a power supply of the first device is less than about 5% of a maximum capacity. When the remaining charge is not less than 5% of the maximum capacity, the first portion 405 remains at the operation 415. When the remaining charge is less than 5% of the maximum capacity, the first portion proceeds to operation 420. In other examples, the alert message is sent based on another threshold of remaining charge such as about 10%, about 20%, about 2%, or any other suitable amount of charge remaining. In at least some examples, the alert message is sent based on a rate of discharge of the power supply of the first device, such that at a particular current draw, the alter message is sent with a particular amount of time of charging remaining (e.g., the alert message is sent about 5 minutes before charging terminates, etc.). In at least some examples, the alert message is, or is sent as a component of, a PD message.

At operation 420, the first device transmits an alert message. In at least some examples, the alert message includes a status of the first device and indicates the remaining charge of the power supply of the first device. For example, in some implementations the power supply of the first device is a battery and the status of the first device indicates a charge remaining in the battery. The alert message is transmitted, in at least some examples, to the second device when the second device is coupled to the first device and receiving power from the first device.

At operation 425, the second device receives an alert message. In at least some examples, the alert message is received from the first device. For example, in at least some implementations the alert message received at operation 425 is the alter message transmitted by the first device at operation 420. In other examples, the alert message received by the second device at the operation 425 is received from any suitable source, the scope of which is not limited herein, such that the second portion 410 of the method is separable and can stand alone from the first portion 405 of the method. The alert message, in at least some examples, indicates a status of a device operating as a source device to provide power to the second device. For example, the status includes a remaining charge of a power supply, such as a battery, of the source device.

At operation 430, the second device disables a DRP functionality of the second device. In at least some examples, disabling the DRP functionality prevents the second device from presenting Rp on a CC line coupling the second device to the first device and beginning to operate as a source device to recharge the first device when the first device is presenting Rd on the CC line. Alternatively, in at least some examples instead of disabling the DRP functionality at operation 430, the second device limits a permitted rate of power transfer such that power transfer is inhibited but not entirely prevented.

At operation 435, the second device determines whether a user wishes for the second device to operate as a source device. The second device makes the determination, in at least some examples, based on input received from the user. The input is received, in some examples, via a physical, articulable input source such as a switch, toggle, button, etc. In other examples, the input is received via a soft input source such as a software button, graphical user interface button, software settings toggle, etc. When the user does not wish for the second device to operate as a source device, the second portion 410 of the method remains at the operation 435. When the user wishes for the second device to operation as a source device, the second portion 410 of the method proceeds to operation 440.

At operation 440, the second device enables the DRP functionality of the second device. In at least some examples, enabling the DRP functionality permits the second device to present Rp on the CC line and begin to operate as a source device to recharge the first device when the first device (or another device coupled to the second device) is presenting Rd on the CC line. Alternatively, when the second device did not disable the DRP functionality at operation 430 and instead inhibited the power transfer, at operation 440 the second device removes the limit to the permitted rate of power transfer that was imposed at operation 430.

Figure 5:
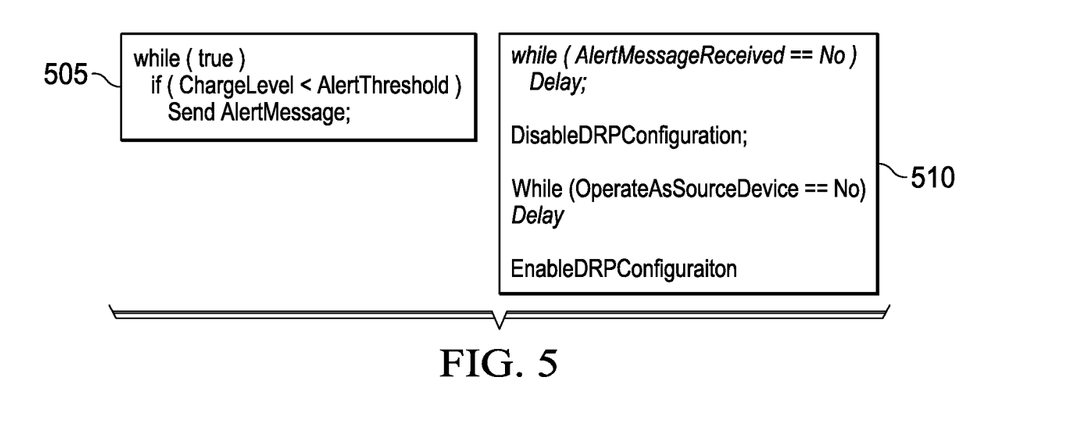
FIG. 5 shows a table of illustrative pseudocode for implementing power transfer in accordance with various examples.

Turning now to FIG. 5, a table 505 and a table 510 of illustrative pseudocode for implementing power transfer is shown. In at least some examples, execution of the pseudocode illustrated in the table 505 implements at least some operations of the method of FIGS. 4A and 4B, such as those operations included in the first portion 405 of the method of FIGS. 4A and 4B. Similarly, in at least some examples execution of the pseudocode illustrated in the table 510 implements at least some operations of the method of FIGS. 4A and 4B, such as those operations included in the second portion 410 of the method of FIGS. 4A and 4B. The pseudocode of table 505 is implemented, in at least some examples, by a micro-processing unit, such as the micro-processing unit 114 of FIG. 1, when the micro-processing unit is implemented in a source device, as described elsewhere herein. The pseudocode of table 510 is implemented, in at least some examples, by a micro-processing unit, such as the micro-processing unit 114 of FIG. 1, when the micro-processing unit is implemented in a sink device, as described elsewhere herein.

As illustrated by the pseudocode of the table 505, the first device continuously monitors a charge to determine whether the charge level is less than an alter threshold. In at least some examples, the charge level is of a power supply, such as a battery, of the first device and the alert threshold is a percentage of maximum charge remaining, an amount of time remaining until charge termination, or any other suitable threshold. When the charge level is less than the alert threshold, an alert message is sent.

As illustrated by the pseudocode of the table 510, when the second device has not received an alert message, the second device calls a Delay sub-routine that implements a delay for a predetermined period of time before returning to again determine whether an alert message has been received. When the second device receives an alert message, the second device disables DRP functionality by calling a routine DisableDRPConfiguration. After disabling the DRP functionality the second device monitors for user input, delaying until input is received. In some examples, the user input takes the form of a user unplugging and re-plugging a coupling between the first device and the second device. For example, when a user indicates that the second device should operate as a source device (causing the variable OperateAsSourceDevice to have a value of true, such as set by another routine or sub-routine), the second device enables the DRP functionality. In at least some examples, the DRP functionality is enabled by calling a routine EnableDRPConfiguration.

While the table 505 and the table 510 illustrate pseudocode that includes certain variables, operations, functions, and a process flow, various other programming implementations of the method of FIGS. 4A and 4B exist. The pseudocode of table 505 and table 510 is not meant to exclude these other programming implementations from the scope of the present disclosure. Instead, the pseudocode of table 505 and table 510 merely illustrates one exemplary implementation while retaining other programming implementations of the method of FIGS. 4A and 4B within the scope of the present disclosure.

Figure 6:
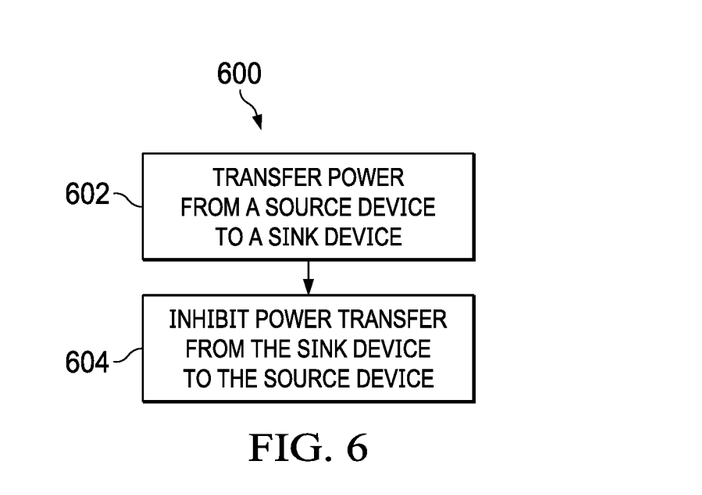
FIG. 6 shows a flowchart of an illustrative method for power transfer in accordance with various examples.

Turning now to FIG. 6, a flowchart of an illustrative method 600 for power transfer is shown. In at least some examples, the method 600 is implemented by a micro-processing unit, such as the micro-processing unit 114, in either a source device such as the source device 102 or a sink device such as the sink device 106.

At operation 602, power is transferred from a source device and a sink device. The power is transferred, for example, from the source device to the sink device. While the power is transferred from the source device to the sink device the source device is in a sourcing state or mode of operation and terminates a coupling between the source device and the sink device with a pull-up termination. Similarly, while the power is transferred from the source device to the sink device the sink device is in a sinking state or mode of operation and terminates the coupling between the source device and the sink device with a pull-down termination.

At operation 604, power transfer from the sink device to the source device is inhibited. Inhibiting the power transfer, in some examples, prevents the power transfer such as until user input is received directing the power transfer to occur. In other examples, inhibiting the power transfer permits the power transfer to occur but at a reduced rate of transfer (e.g., when compared to a rate of transfer when uninhibited).

Multiple suitable processes exist for inhibiting the power transfer. In at least one example, in one implementation the source device sends the sink device an alert message that indicates a charge remaining in a power supply of the source device. Based at least partially on this alert message, the sink device inhibits transfer of power back to the source device from the sink device. The power transfer is inhibited, in at least some examples, until a timer expires and/or until user input is received. The user input can include a user unplugging and re-plugging the coupling between the source device and the sink device, the user pushing a hardware or software button, the user toggling a switch, etc.

In another example, when the power supply of the source device depletes, the source device changes charging states or modes from sourcing to sinking. The change is accomplished by the source device removing a pull-up termination of the coupling between the source device and the sink device and providing a pull-down termination to the coupling between the source device and the sink device. The sink device detects the removal of the pull-up termination and begins a timer. If the sink device detects the pull-down termination of the coupling between the source device and the sink device, the sink device inhibits power transfer back to the source device. For example, the sink device permits the power transfer at a reduced rate or the sink device prevents the power transfer. The inhibiting of the power transfer continues, in at least some examples, until user input is received instructing the sink device to transfer power to the source device.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., FET, metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
   a transistor having first and second current terminals and a control terminal;
   a controller having a user-controllable input, a control output, a configuration terminal, a power supply terminal, and a device power terminal, the control output coupled to the control terminal, the power supply terminal coupled to the first current terminal, the device power terminal coupled to the second current terminal, and the controller configured to:
   responsive to a first signal at the configuration terminal, transfer power from the device power terminal to the power supply terminal at a first rate; and
   responsive to a second signal at the configuration terminal:
      if the user-controllable input has a first state, transfer power from the first power supply terminal to the device power terminal at the first rate; and
      if the user-controllable input has a second state, limit a transfer of power from the power supply terminal to the device power terminal by: (a) prohibiting the transfer of power from the power supply terminal to the device power terminal; or (b) transferring power from the first power supply terminal to the device power terminal at a second rate below the first rate.

2. The circuit of claim 1, wherein each of the first signal and the second signal indicates a respective state of termination of a device coupled to the device power terminal and the configuration terminal, the state of termination comprising one of: an open state, a pull-up termination state, or a pull-down termination state.

3. The circuit of claim 2, wherein the controller is configured to:
   responsive to the first signal indicating the pull-up termination state, transfer power from the device power terminal to the power supply terminal at the first rate;
   responsive to a third signal at the configuration terminal indicating a change from the pull-up termination state, start a timer;
   if the second signal indicates the pull-down termination state before the timer expires, limit the transfer of power from the power supply terminal to the device power terminal; and
   if the second signal indicates the pull-down termination state after the timer expires, transfer power from the power supply terminal to the device power terminal at the first rate.

4. The circuit of claim 3, wherein the controller is configured to:
   based on receiving, before the timer expires, the second signal indicating the pull-down termination state, limit the transfer of power from the power supply terminal to the device power terminal; and based on the user-controllable input having the first state, remove the limit on the transfer of power from the power supply terminal to the device power terminal.

5. The circuit of claim 1, wherein:
the controller is configured to limit the transfer of power from the power supply terminal to the device power terminal responsive to receiving a message indicating at least one of: (a) a power supply of a device coupled to the device power terminal having a power level below a threshold; or (b) the transfer of power from the power supply terminal to the device power terminal is to be limited.

6. The circuit of claim 1, further comprising a termination circuit coupled to the configuration terminal;
wherein the controller is configured to:
place the termination circuit in a pull-up termination state to transfer power from the power supply terminal to the device power terminal;
place the termination circuit in a pull-down termination state to transfer power from the device power terminal to the power supply terminal; and
place the termination circuit in an open state or in the pull-down termination state to prohibit the transfer of power from the power supply terminal to the device power terminal.

7. The circuit of claim 1, wherein the configuration terminal and the device power terminal are adapted to be coupled to a device through a type C Universal Serial Bus; and
wherein the controller is at least a portion of a type C Universal Serial Bus power delivery controller.

8. A system, comprising:
a transistor having first and second current terminals and a control terminal; and
a controller having a control input, a control output, a power supply terminal, and a device power terminal, the control output coupled to the control terminal, the power supply terminal coupled to the first current terminal, the device power terminal coupled to the second current terminal, and the controller configured to:
determine, based on a signal at the control input, an amount of stored energy of a power supply,
responsive to the signal indicating that the power supply has a first amount of stored energy, transfer power from the power supply terminal to the device power terminal at a first rate; and
responsive to the signal indicating that the power supply has less energy than the first amount of stored energy, inhibit a transfer of power from the device power terminal to the power supply terminal by: (a) prohibiting the transfer of power from the device power terminal to the power supply terminal; or (b) transferring power from the device power terminal to the power supply terminal at a second rate below the first rate.

9. The system of claim 8, wherein:
the control output is a first control output;
the controller further comprises a second control output; and
the controller is configured to inhibit the transfer of the power from the device power terminal to the power supply terminal by transmitting, via the control output, a message indicating at least one of: (a) the power supply has less than the first amount of stored energy; or (b) the transfer of power from the device power terminal to the power supply terminal is to be inhibited.

10. The system of claim 8, wherein:
the controller has a configuration terminal;
the system further comprises a termination circuit coupled to the configuration terminal; and
the controller is configured to:
place the termination circuit in a pull-up termination state to transfer power from the power supply terminal to the device power terminal;
place the termination circuit in an open state or in the pull-up termination state to prohibit the transfer of power from the device power terminal to the power supply terminal; and
place the termination circuit in a pull-down termination state to transfer power from the device power terminal to the power supply terminal.

11. The system of claim 10, wherein the device power terminal and the configuration terminal are adapted to be coupled to a device through a type C Universal Serial Bus port.

12. The system of claim 8, wherein:
the control input is a first control input;
the signal is a first signal;
the controller has a user-controllable input;
the controller is configured to, responsive to the first signal indicating that the power supply has less energy than the first amount of stored energy:
if the user-controllable input has a first state, transfer power from the device power terminal to the power supply terminal at the first rate; and
if the user-controllable input has a second state, inhibit the transfer of power from the device power terminal to the power supply terminal.

13. The system of claim 12, wherein the user-controllable input is adapted to be coupled to an input device; and
wherein the first and second states of the user-controllable input are selectable by the input device.

14. A tangible non-transitory computer readable storage medium that comprises instructions that, when executed by a controller, cause the controller to:
receive a first signal at a configuration terminal of the controller;
responsive to the first signal, transfer power from a device power terminal of the controller to a power supply terminal of the controller;
receive a second signal at the configuration terminal;
determine a state of a user-controllable input of the controller; and
responsive to the second signal:
if the user-controllable input has a first state, transfer power from the power supply terminal to the device power terminal at a first rate; and
if the user-controllable input has a second state, limit a transfer of power from the power supply terminal to the device power terminal by: (a) prohibiting the transfer of power from the power supply terminal to the device power terminal; or (b) transferring power from the power supply terminal to the device power terminal at a second rate below the first rate.

15. The computer readable storage medium of claim 14, wherein:
each of the first signal and the second signal indicates a respective state of termination of a device coupled to the device power terminal and to the configuration terminal, the state of termination comprising one of: an open state, a pull-up termination state, or a pull-down termination state; and the computer readable storage medium further comprises instructions that, when executed by the controller, cause the controller to:
- responsive to the first signal indicating the pull-up termination state, transfer power from the device power terminal to the power supply terminal at the first rate;
- responsive to a third signal at the configuration terminal indicating a change from the pull-up termination state, start a timer;
- if the second signal indicates the pull-down termination state before the timer expires, limit the transfer of power from the power supply terminal to the device power terminal; and
- if the second signal indicates the pull-down termination state after the timer expires, transfer power from the power supply terminal to the device power terminal at the first rate.

16. The computer readable storage medium of claim 15, wherein the computer readable storage medium further comprises instructions that, when executed by the controller, cause the controller to:
- based on receiving, before the timer expires, the second signal indicating the pull-down termination state, limit the transfer of power from the power supply terminal to the device power terminal; and
- based on the user-controllable input having the first state, remove the limit on the transfer of power from the power supply terminal to the device power terminal.

17. The computer readable storage medium of claim 14, wherein the computer readable storage medium further comprises instructions that, when executed by the controller, cause the controller to limit the transfer of power from the power supply terminal to the device power terminal responsive to receiving a message indicating at least one of: (a) a power supply having a power level below a threshold; or (b) the transfer of power from the power supply terminal to the device power terminal is to be limited.

18. The computer readable storage medium of claim 17, wherein the configuration terminal is coupled to a termination circuit; and wherein the computer readable storage medium further comprises instructions that, when executed by the controller, cause the controller to:
- place the termination circuit in a pull-up termination state to transfer power from the power supply terminal to the device power terminal;
- place the termination circuit in a pull-down termination state to transfer power from the device power terminal to the power supply terminal; and
- place the termination circuit in an open state or in the pull-down termination state to prohibit the transfer of power from the power supply terminal to the device power terminal.

* * * * *